United States Patent
Burnham et al.

(10) Patent No.: US 9,300,682 B2
(45) Date of Patent: Mar. 29, 2016

(54) COMPOSITE ANALYSIS OF EXECUTABLE CONTENT ACROSS ENTERPRISE NETWORK

(71) Applicant: Lockheed Martin Corporation, Bethesda, MD (US)

(72) Inventors: James B. Burnham, San Ramon, CA (US); Robert W. Hale, Manassas, VA (US); Timothy A. Sewell, Omaha, NE (US)

(73) Assignee: Lockheed Martin Corporation, Bethesda, MD (US)

( * ) Notice: Subject to any disclaimer, the term of this patent is extended or adjusted under 35 U.S.C. 154(b) by 71 days.

(21) Appl. No.: 13/963,674

(22) Filed: Aug. 9, 2013

(65) Prior Publication Data

US 2015/0047034 A1    Feb. 12, 2015

(51) Int. Cl.
*H04L 29/06*    (2006.01)

(52) U.S. Cl.
CPC ........ *H04L 63/1425* (2013.01); *H04L 63/1441* (2013.01)

(58) Field of Classification Search
CPC .......................... H04L 63/145; H04L 63/1441
USPC .......................................................... 726/23
See application file for complete search history.

(56) References Cited

U.S. PATENT DOCUMENTS

| | | | |
|---|---|---|---|
| 7,613,926 B2 * | 11/2009 | Edery et al. .................... | 713/181 |
| 7,877,801 B2 * | 1/2011 | Repasi et al. ................... | 726/22 |
| 7,954,158 B2 | 5/2011 | Denton | |
| 8,161,130 B2 | 4/2012 | Stokes et al. | |
| 8,196,205 B2 | 6/2012 | Gribble et al. | |
| 8,260,914 B1 | 9/2012 | Ranjan | |
| 8,356,001 B2 | 1/2013 | Collazo | |
| 8,418,249 B1 | 4/2013 | Nucci et al. | |
| 8,959,624 B2 * | 2/2015 | Gray et al. ...................... | 726/22 |
| 2008/0010255 A1 | 1/2008 | Lee et al. | |
| 2008/0184371 A1 | 7/2008 | Moskovitch et al. | |
| 2009/0019546 A1 | 1/2009 | Park et al. | |
| 2009/0199296 A1 | 8/2009 | Xie et al. | |
| 2010/0146589 A1 | 6/2010 | Safa | |
| 2010/0333177 A1 | 12/2010 | Donley et al. | |
| 2011/0283357 A1 | 11/2011 | Pandrangi et al. | |
| 2011/0320187 A1 | 12/2011 | Motik et al. | |
| 2012/0017281 A1 | 1/2012 | Banerjee et al. | |
| 2012/0023572 A1 | 1/2012 | Williams, Jr. et al. | |

(Continued)

FOREIGN PATENT DOCUMENTS

KR    10-2012-0136126    5/2013

*Primary Examiner* — Longbit Chai
(74) *Attorney, Agent, or Firm* — Marsh Fischmann & Breyfogle LLP

(57) ABSTRACT

Identification, characterization and attribution of executable content within and across an enterprise infrastructure (e.g., hosts, subnets, routers, etc.) to provide situational awareness for cyber security for purposes of supporting proactive defense and response. Copies of executable content collected at one or more locations within an infrastructure (e.g., hosts, network edges, etc.) may be passed to a central analysis server whereby various characteristics of the executable content may be extracted or gleaned from the copies such as author marks (e.g., directory names), tool marks (e.g., compiler settings), behaviors (e.g., function extraction), patterns (e.g., byte sequences), text, and/or the like. The characteristics may be analyzed in various manners to build profiles of actors or organizations associated with (e.g., responsible for) executable content within the enterprise infrastructure.

21 Claims, 6 Drawing Sheets

(56) References Cited

U.S. PATENT DOCUMENTS

| | | |
|---|---|---|
| 2012/0060221 A1 | 3/2012 | Gerber et al. |
| 2012/0096549 A1 | 4/2012 | Amini et al. |
| 2012/0096555 A1 | 4/2012 | Mahaffey |
| 2012/0137367 A1 | 5/2012 | Dupont et al. |
| 2012/0233098 A1 | 9/2012 | Schwoegler et al. |
| 2012/0304300 A1 | 11/2012 | LaBumbard |
| 2013/0055388 A1 | 2/2013 | Thomas et al. |
| 2013/0097706 A1 | 4/2013 | Titonis et al. |
| 2013/0104236 A1 | 4/2013 | Ray et al. |

* cited by examiner

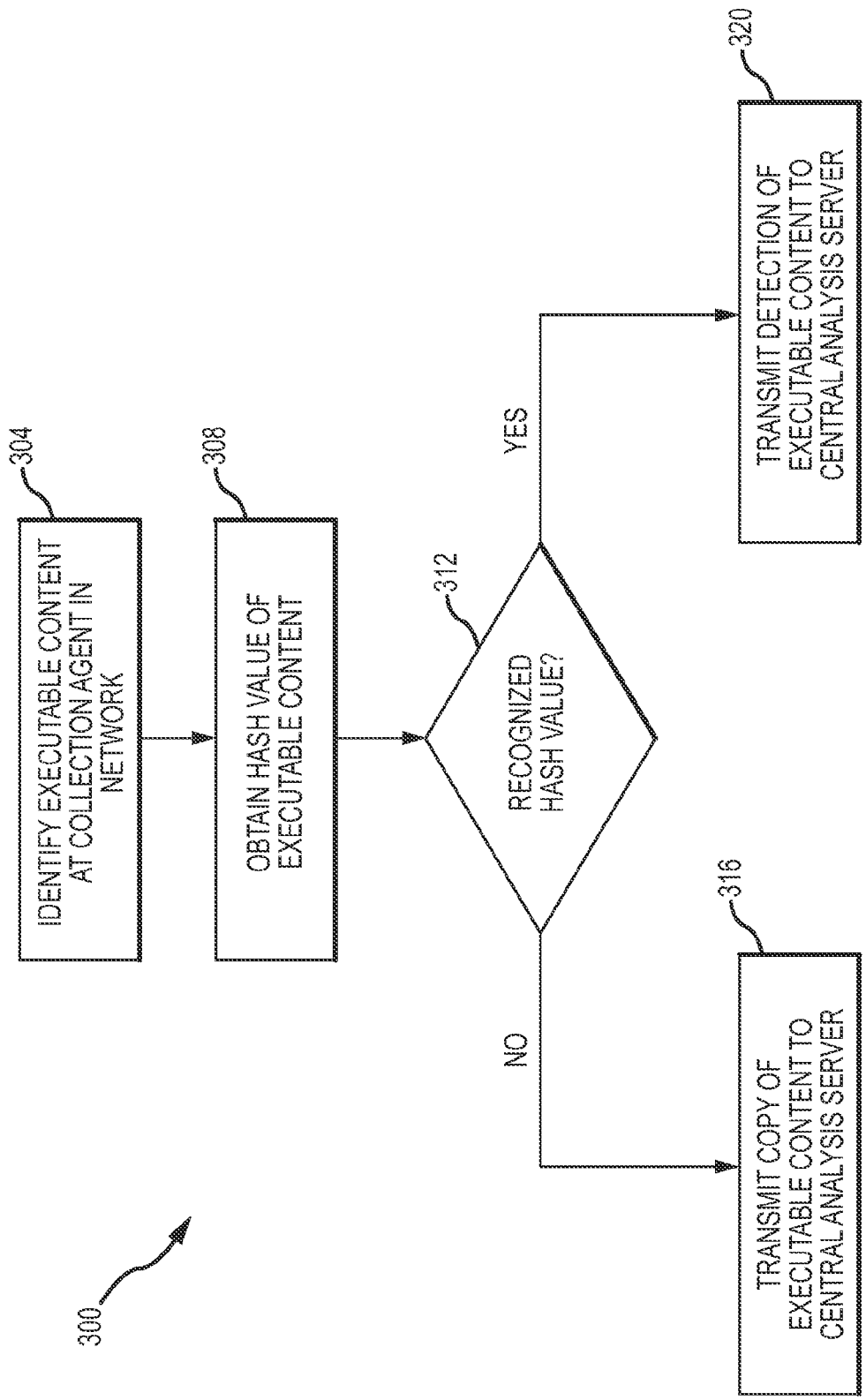

| EXECUTABLE CONTENT | HASH VALUE | COLLECTION AGENT | LOCATION | DATE | TIME | AUTHOR MARK |
|---|---|---|---|---|---|---|
| EC1 | D443G7 | COLLECTION AGENT A | IP ADDRESS A | 4/2/2013 | 23:00 | 1010001 |
| EC2 | 4488BB | COLLECTION AGENT B | IP ADDRESS B | 5/1/2013 | 23:30 | 1011111 |
| EC3 | 34GU89 | COLLECTION AGENT A | IP ADDRESS A | 6/1/2013 | 5:30 | 1110001 |

FIG.5

| PROFILE | AUTHOR MARK(S) | TOOL MARK(S) | HASH VALUES | TYPE |
|---|---|---|---|---|
| PROFILE 1 | AUTHOR MARK SET 1 | TOOL MARK SET 1 | HASH VALUE SET 1 | MALICIOUS |
| PROFILE 2 | AUTHOR MARK SET 2 | TOOL MARK SET 2 | HASH VALUE SET 2 | SUSPECT |
| PROFILE 3 | AUTHOR MARK SET 3 | TOOL MARK SET 3 | HASH VALUE SET 3 | SAFE |

COMPOSITE ANALYSIS OF EXECUTABLE CONTENT ACROSS ENTERPRISE NETWORK

FIELD OF THE INVENTION

The present invention relates generally to executable content such as compiled programs and scripts and, more particularly, to systems and methods of analyzing executable content for obtaining information of interest.

BACKGROUND OF THE INVENTION

In computing, executable content generally causes a computing device (e.g., desktop, laptop, tablet, smartphone, etc.) to perform indicated tasks according to encoded instructions (e.g., by a central processing unit (CPU) or the like), as opposed to a data file that typically must be parsed by a program to be meaningful. For instance, an executable program is a program that has been compiled from source code into binary machine code that is directly executable by the CPU of a computing device. Almost every application (e.g., email client, word processor, spreadsheet, etc.) begins with execution of an executable file which is typically considered safe so long as they are obtained directly from the application's publisher and/or if the publisher is otherwise trusted.

Malware (malicious software) is executable content used or programmed by attackers to disrupt computer operation, gather sensitive information, gain access to private computer systems, and/or the like and can appear in the form of code, scripts, active content, and other software. For instance, malware may include computer viruses, ransomware, worms, trojan horses, rootkits, keyloggers, dialers, spyware, adware, rogue security software, and/or the like. In some situations, malware may be disguised as genuine software and may even come from an official company website in the form of a useful or attractive program which has the harmful malware embedded in it (e.g., along with additional tracking software that gathers marketing statistics).

Current manners of identifying malware and/or limiting malware attacks are often deployed with respect to individual computing devices (e.g., hosts) of an organization or enterprise (e.g., as part of any appropriate cyber security practices) and include use of programs such as anti-virus software, anti-malware software, firewalls, and the like. However, these current practices often rely on point solutions that provide signature-based identification of known malicious content which necessarily limits identification of malicious content that is not yet known as being "malicious." For instance, rule-based compliance systems depend on keyword matches or content identification (e.g., using a fingerprinting algorithm or the like). Some systems can identify possibly malicious content based on correlations between an executable file of interest and a known malicious file.

For malicious content that has not been previously identified as being malicious, current solutions often alert on the effects of the malicious content. However, the aforementioned effects can be difficult to isolate from the effects of non-malicious content and often require prioritization, time-consuming manual discovery, and forensic review leading to long periods of time before significant breaches can even be detected. Oftentimes, cyberspace decision makers are forced to react with incomplete, misleading, and/or outdated information that can lead to suboptimal outcomes.

SUMMARY OF THE INVENTION

The inventors have determined that collection of executable content (whether or not the executable content is malicious and/or already known to be malicious) traversing and/or residing within multiple execution domains of an enterprise and near real-time analysis of such executable content is needed for gleaning information of interest for use in limiting the effect of malicious executable content on enterprise resources. Stated differently, it has been determined that identification, characterization and attribution of malicious content through the analysis of indicators within and across an entire set of executable content on one or more networks will allow a currently non-existent form of situational awareness for cyber security and the like to support proactive defense and response. As will be appreciated, various utilities disclosed herein (e.g., systems, platforms, tools, methods, etc.) provide an ability to track executable content as it enters and spreads throughout a network to provide a breakthrough cyber capability for significantly limiting the capabilities of malicious actors. For instance, executable content that has been determined to be malicious (e.g., based on a determination of intent of deployment of the executable content) may be appropriately quarantined or eliminated from the enterprise infrastructure.

Some or all executable content (e.g., JavaScript® code, program files, application-specific monitoring taps, etc.) residing or passing within or into an enterprise IT infrastructure may be copied and collected in any appropriate manner and passed (e.g., either the copies or at least corresponding metadata) over one or more networks of the infrastructure to at least one central server (e.g., which may or may not be resident within the particular infrastructure of interest) for subsequent analyses. As one example, any appropriate collection agent (e.g., software application) may be configured to run or execute on each infrastructure computing device to detect executable content being downloaded to and/or uploaded from the computing device (e.g., via network, Universal Serial Bus (USB) connection, etc.), copy or otherwise parse any appropriate information from the executable content, tag the executable content copy with any appropriate location information of the host (e.g., IP address, host name, etc.) and/or timestamp, and then distribute the executable content copy and/or tagged information to the central analysis server via any appropriate protocol. As another example, any appropriate network traffic monitor (e.g., software and/or hardware, such as a packet sniffer) may be installed or deployed at one or more strategic points in an enterprise's IT infrastructure (e.g., network edges, major subnet divisions, border router at ledge of web server farm, and/or the like) and designed to detect all executable content passing through the particular network point, copy or otherwise parse any appropriate information from the executable content, tag the executable content copy with any appropriate location information of the strategic point (e.g., IP address, etc.) and/or timestamp, and distribute the executable content copies and/or tagged information to the central analysis server.

Once the executable content has been received and stored in any appropriate data structure at the central server (or at least for access by the central server), an extraction engine of the central server may extract or glean one or more characteristics (e.g., indicators) from the executable content and store or record the extracted characteristics in any appropriate form. Representative examples of extracted characteristics may include "author marks" (e.g., directory names or strings), "tool marks" (e.g., compiler settings), behaviors (e.g., function extraction), patterns (e.g., byte sequences), text, and/or the like. In one arrangement, the extracted characteristics may be recorded in any appropriate time-series form such as by host identifier (e.g., name, IP address, etc.), executable content identifier (e.g., hash value, file name, etc.), date, time, etc. In another arrangement, the extracted characteristics may be grouped according to related content (e.g., common author/tool marks) in any appropriate hypergraph format. In a further arrangement, the extracted characteristics may be recorded in semantic graph form, such as in conjunction with metadata derived from the collection context of the content and/or from external sources (e.g., known malicious actors associated with the source of the executable content).

An analysis engine of the central server and/or manual analyst input may serve to detect linkages or associations among one or more characteristics or sets of characteristics across the collected executable content. For instance, associations between common author marks and/or tool marks and particular behaviors may be identified (e.g., via automated and/or non-automated manners) and recorded for use in subsequent analytics. In one arrangement, particular author or tool marks or sets of author and tool marks may be used to build profiles of one or more particular "actors" (e.g., organizations, application providers, attackers, and/or other entities) that are presumably responsible for deploying particular executable content within the enterprise. Stated differently, each of a number of actors may be identified or represented by particular author or tool marks or sets of author and tool marks of executable content found or used within the enterprise infrastructure.

For instance, a particular combination of a directory string (e.g., a particular series of bits) extracted from JavaScript® content within the enterprise infrastructure (e.g., and recorded as an author mark) and a group of compiler settings (e.g., enable compiler warnings, profile code when executed, copy non-embedded files to output folder, etc.) from the content (e.g., recorded as tool marks) may identify or otherwise be associated with a particular actor (e.g., Actor "A"). Over time, one or more behaviors or other characteristics may be identified (e.g., automatically) or observed (e.g., manually) in conjunction with the particular profile characteristics (e.g., the author mark(s) and/or tool mark(s)) for providing situational awareness for cyber security and the like to support proactive defense and response. Subsequent executable content characteristics received and processed at the central server may serve to further refine developed profiles of identified actors.

As one example, the detection of a particular set of author and tool marks within collected executable content such as one version of Microsoft® Word different (e.g., in terms of one or more extracted characteristics) than another version of Microsoft® Word that is more widely disseminated throughout the enterprise may increase the likelihood that the actor represented by the particular set of author and tool marks is a malicious/non-trusted actor (or at least decrease the likelihood that the actor is a trusted/non-malicious actor). As another example, the detection of a particular set of author and tool marks within collected executable content received from a known malicious/non-trusted source may serve to increase the likelihood that the actor represented by the particular set of author and tool marks is a malicious/non-trusted actor (or at least decrease the likelihood that the actor is a trusted/non-malicious actor). As a further example, the detection of a particular set of author and tool marks within collected executable content received from a trusted and/or safe source (e.g., a content update for a particular program) may serve to increase the likelihood that the actor represented by the particular set of author and tool marks is a trusted/non-malicious actor (or at least decrease the likelihood that the actor is a malicious actor).

Profiles may be developed via non-automated and/or automated manners. For instance, analysts and/or other enterprise personnel may identify or recognize particular characteristics, patterns, and the like of certain pieces (e.g., portions) or types of executable content indicative of a particular type of actor, organization, etc. (e.g., malicious, non-malicious, suspect, etc.) based upon personal knowledge, historical data, open-source information, and/or the like. As another example, any appropriate logic may be executed by a processor of the central analysis server or the like that is configured to automatically detect suspected malicious actors/organizations from the collected executable content and/or extracted characteristics. For instance, the central analysis server may be configured to flag as malicious (or at least possibly malicious) a profile constructed from characteristics extracted from executable content when the central analysis server detects (from extracted characteristics) that the executable content has been deployed on more than a threshold number of hosts within a particular period of time. Enterprise personnel may be alerted in any appropriate manner (e.g., via a user interface interconnected to the central analysis server) that a profile has been flagged as malicious or possibly malicious. Profiles may be created, updated, and/or revised in near real-time (e.g., upon each new update of the database(s) of the central analysis server).

The various extracted characteristics and detected linkages/associations between and among the extracted characteristics of executable content across an enterprise's infrastructure may be recorded or stored in any appropriate data structure (e.g., database) in one or more storage devices of the central server (or at least accessible by the central server) to advantageously provide a wealth of information that may be used by analysts and other enterprise personnel in monitoring executable content within the enterprise. For instance, the stored information can improve real-time situational awareness (e.g., for cyber security efforts and the like) by enabling a true enterprise view of executable content (e.g., rather than merely with respect to individual hosts or networks of the enterprise).

In one arrangement, executable content can be tracked or otherwise monitored over time as it spreads or propagates throughout an enterprise's infrastructure (e.g., through hosts, within subnets, across subnets, across networks, etc.), such as to present a near-real-time view of attacks-in-progress. As one example, assume that after analyzing the various collected executable content, detected linkages and/or ascertained actor profiles, enterprise personnel determine that a particular profile (e.g., specific set of author and tool marks) is associated with (e.g., credited with) a particular version of software that is different than the more mainstream version of the same piece of software in use within the enterprise. As such, the enterprise personnel may ascertain that it would be beneficial to monitor enterprise executable content that is associated with the profile as it moves throughout the enterprise infrastructure (e.g., as such executable content may have a greater likelihood of being malicious than the more mainstream version).

In this regard, previously and/or newly collected executable content having extracted/gleaned characteristics the same as or similar to (e.g., within a fuzzy interval) those of the particular profile (e.g., the specific set of author and tool marks) may be attributed to (e.g., correlated with) the profile (e.g., to an actor associated with the profile). Furthermore, executable content attributed to the profile may be tracked and/or analyzed in various manners. In one embodiment, a hash of each of one or more pieces of executable content attributed to the particular profile may be obtained (e.g., via a processor using any appropriate hash function) and then used to monitor the specific pieces as they move throughout the enterprise infrastructure.

For instance, each collection agent (e.g., deployed at infrastructure hosts) and/or network monitor (e.g., deployed at network edges, subnet divisions, etc.) may, in addition to copying and/or tagging received executable content, execute (e.g., via a processor) any appropriate hash function on the executable content to obtain a hash value that uniquely identifies the executable content. The hash value may be sent from the collection agent and/or network monitor up to the central analysis server along with the copy of the executable content. In one arrangement, the collection agent and/or network monitor may be configured to query whether it has already obtained the same hash value during previous execution of a hash function.

In response to a positive answer to the query, the collection agent and/or network monitor may be configured to not send a copy of the executable content up to the central analysis server as obtaining the same hash value indicates that the collection agent and/or network monitor has already done so. However, the collection agent and/or network monitor may still be configured to send some indication to the central analysis server of the occurrence of receipt of the particular piece of executable content (e.g., a message tagged with the hash value, timestamp, etc.) at the host and/or strategic point (e.g., to allow the central analysis server to perform any appropriate analytics, such as frequency of occurrence, etc.). In any case, the central analysis server may appropriately record and correlate the obtained hash values with its associated location information, timestamps, profile, etc. to allow enterprise personnel to observe or otherwise perceive where the executable content has traveled within the enterprise over time, its behaviors over time (whether it is replicating itself and/or how quickly it is doing so), and the like.

The disclosed utilities may also allow for tracking of particular pieces and/or types of enterprise executable content over time regardless of any particular profile and/or actor associated with the executable content. For instance, enterprise personnel may, after analyzing the collected executable content and extracted characteristics, determine that a particular piece of executable content appears interesting for one or more reasons (e.g., its difference from other similar pieces of executable content, the rate at which it is replicating itself, a timestamp of when the executable content was received at a host, a manner by which the executable content was transferred to a host, etc.). Similarly, a particular hash value associated with the executable content may be monitored throughout the enterprise infrastructure.

The various aspects discussed herein may be implemented via any appropriate number and/or type of platforms, modules, processors, memory, etc., each of which may be embodied in hardware, software, firmware, middleware, and the like. Various refinements may exist of the features noted in relation to the various aspects. Further features may also be incorporated in the various aspects. These refinements and additional features may exist individually or in any combination, and various features of the aspects may be combined. In addition to the exemplary aspects and embodiments described above, further aspects and embodiments will become apparent by reference to the drawings and by study of the following descriptions.

DESCRIPTION OF THE DRAWINGS

For a more complete understanding of the present invention and further advantages thereof, reference is now made to the following Detailed Description, taken in conjunction with the drawings, in which:

FIG. 3a illustrates a flow diagram of a method of identifying executable content at a collection agent and transmitting related information to the central analysis server of FIG. 2.

FIG. 5 is an example of a database of executable content data that may be stored in a storage of the central analysis server of FIG. 2.

FIG. 6 is an example of a database of profiles that may be stored in the storage of the central analysis server of FIG. 2.

DETAILED DESCRIPTION

Disclosed herein are utilities (e.g., systems, processes, etc.) for identifying and monitoring executable content (e.g., compiled programs, scripts, files, browser or other application-specific monitoring and passive network taps for content in-transit, etc.) in an enterprise network. The disclosed utilities employ collection agents disposed throughout the enterprise network to identify executable content (e.g., portions or versions of executable content) traversing the network and a central analysis server to process and monitor the executable content. Characteristics shared by various portions of identified executable content may be used to build profiles of actors (e.g., organizations, application providers, attackers, etc.), associated with known profiles, and/or used to identify malicious executable content. By analyzing the association between detected characteristics of executable content and various stored profiles, the utilities may facilitate the near real-time monitoring of executable content in the enterprise network.

Reference will now be made to the accompanying drawings, which assist in illustrating the various pertinent features of the various novel aspects of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Figure 1:
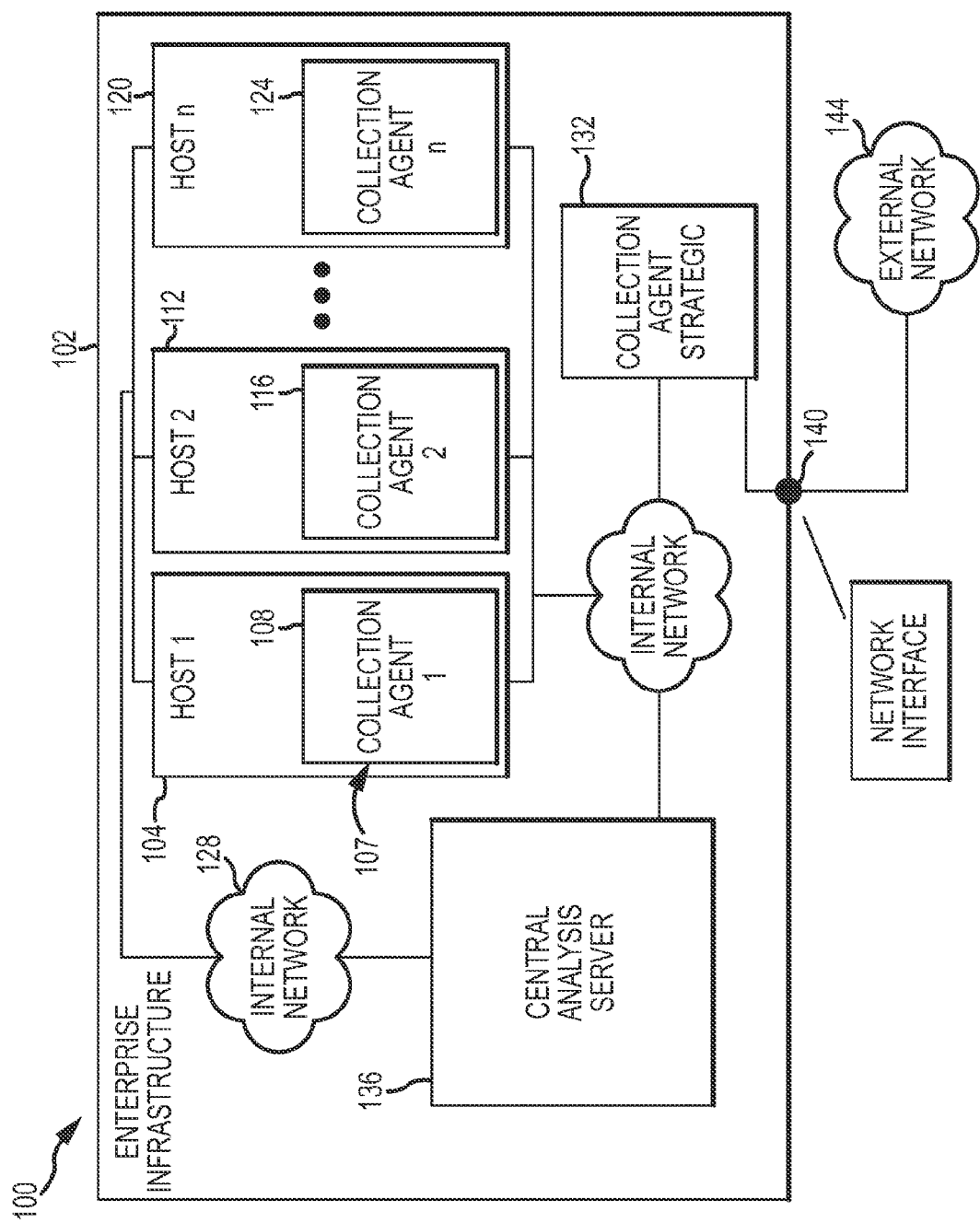
FIG. 1 is a functional block diagram of a system for conducting composite analysis of executable content within an enterprise network, according to one embodiment.

In this regard, FIG. 1 presents a functional block diagram of an illustrative enterprise infrastructure 100 in which executable content may be collected and monitored by utilities disclosed herein. Broadly, the enterprise infrastructure 100 may include any appropriate hardware (e.g., computing devices, data centers, switches), software (e.g., applications, system programs, engines), network components (e.g., communication paths, interfaces, routers) and the like (not necessarily shown in the interest of clarity) for use in facilitating any appropriate operations of the enterprise. The enterprise infrastructure 100 may include a boundary 102 that generally separates (e.g., by firewalls or the like) resources and components inside the enterprise infrastructure 100 from those outside or external to the enterprise infrastructure 100 (e.g., such as internal network 128 from external network 144). For instance, the boundary may be traversed at exemplary network interface 140 by network traffic (e.g., data, packets, executable content, etc.).

As shown, a system for use in performing composite analysis of executable content within the boundary 102 of the enterprise infrastructure 100 may broadly include one or more collections agents 107 (e.g., software, hardware, and/or the like) for use in initially identifying executable content located within or otherwise traversing the enterprise infrastructure 100. The system also includes a central analysis server 136 that receives executable content data (e.g., copies of executable content, hash values resulting from the collection agents performing hash functions on the executable content, location information that identifies a location of the collection agent in the enterprise infrastructure 100, etc., all as discussed herein) and processes the received executable content data to identify links or relations between different portions of executable content, generate profiles of executable content actors responsible for executable content in the enterprise infrastructure, and the like.

In one embodiment, the collection agents 107 may include a plurality of collection agents 108, 116, 124 that reside and are configured to identify executable content on or passing through a respective number of network hosts 104, 112, 120 (e.g., laptops, desktops, servers and/or other computing devices appropriately electrically interconnected to the internal network 128). For instance, each of the collections agents 108, 116, 124 may be in the form of a piece of software or the like that runs in the background of the respective network host 104, 112, 120 and is configured to employ any appropriate pattern recognition logic or the like to identify executable code within or traversing the host. Additionally or alternatively, the collection agents 107 may include at least one collection agent 132 (e.g., such as a network traffic monitor, packet analyzer, packet sniffer, etc.) that resides at a strategic point in the enterprise infrastructure 100 such as at or near a network edge, a major subnet division, a router, and/or the like.

Regardless of its position at a host (e.g., 108, 112, 120) or strategic point (e.g., 132), each collection agent 107 identifies executable content within the enterprise infrastructure 100 and transmits executable content data and/or information to the central analysis server 136 for analysis (e.g., processing and monitoring). In one arrangement, and after identifying a portion of executable content (e.g., a particular version of Microsoft® Word), a collection agent 107 may be configured to obtain a hash value 216 (see FIG. 2) of the executable content (e.g., via subjecting the executable content to any appropriate hash function) that uniquely identifies the executable content and then attempt to identify or locate a similar hash value in any appropriate database of hash values accessible by the collection agent 107. For instance, the hash value database may include a list of hash values obtained by subjecting previous portions of executable content to hash functions.

In one embodiment, the hash value database may represent hash values of all executable content identified by all collection agents 107 in the enterprise infrastructure 100. When the hash value 216 is not identified in the hash value database, the collection agent 107 may proceed to produce a copy 208 (see FIG. 2) of the executable content (e.g., a full replication of the portion of executable content identified at a collection agent), tag the executable content copy 208 with any appropriate location information 212 (see FIG. 2) of the collection agent 107 (e.g., IP address, etc.) and/or timestamp, and distribute the executable content data (e.g., the executable content copy 208, hash value 216, location information 212, and/or timestamp) to the central analysis server 136 over one or more internal networks 128. Newly generated hash values not identified in the hash value database may be added to the database in any appropriate manner for access by all of the collection agents 107 in the enterprise infrastructure 100. For instance, the central analysis server 136 may, after receiving a hash value, add the same to a hash value database maintained on the central analysis server 136 for access and query by the collection agents 107.

In any case, when the hash value is identified in the hash value database (e.g., which may indicate that another instance of the same version of Microsoft® Word has already been identified by a collection agent 107 somewhere in the enterprise infrastructure 100), the collection agent 107 may pass any appropriate message to the central analysis server 136 that includes the particular hash value, location information of the collection agent, timestamp, etc. (e.g., in lieu of sending the executable content to limit consumption of bandwidth and other network resources). The collections agents 107 may be configured to send the executable content data to the central analysis server 136 in near real time, according to any appropriate schedule (e.g., hourly, daily, etc.), upon request from the central analysis server 136, and/or the like.

Figure 2:
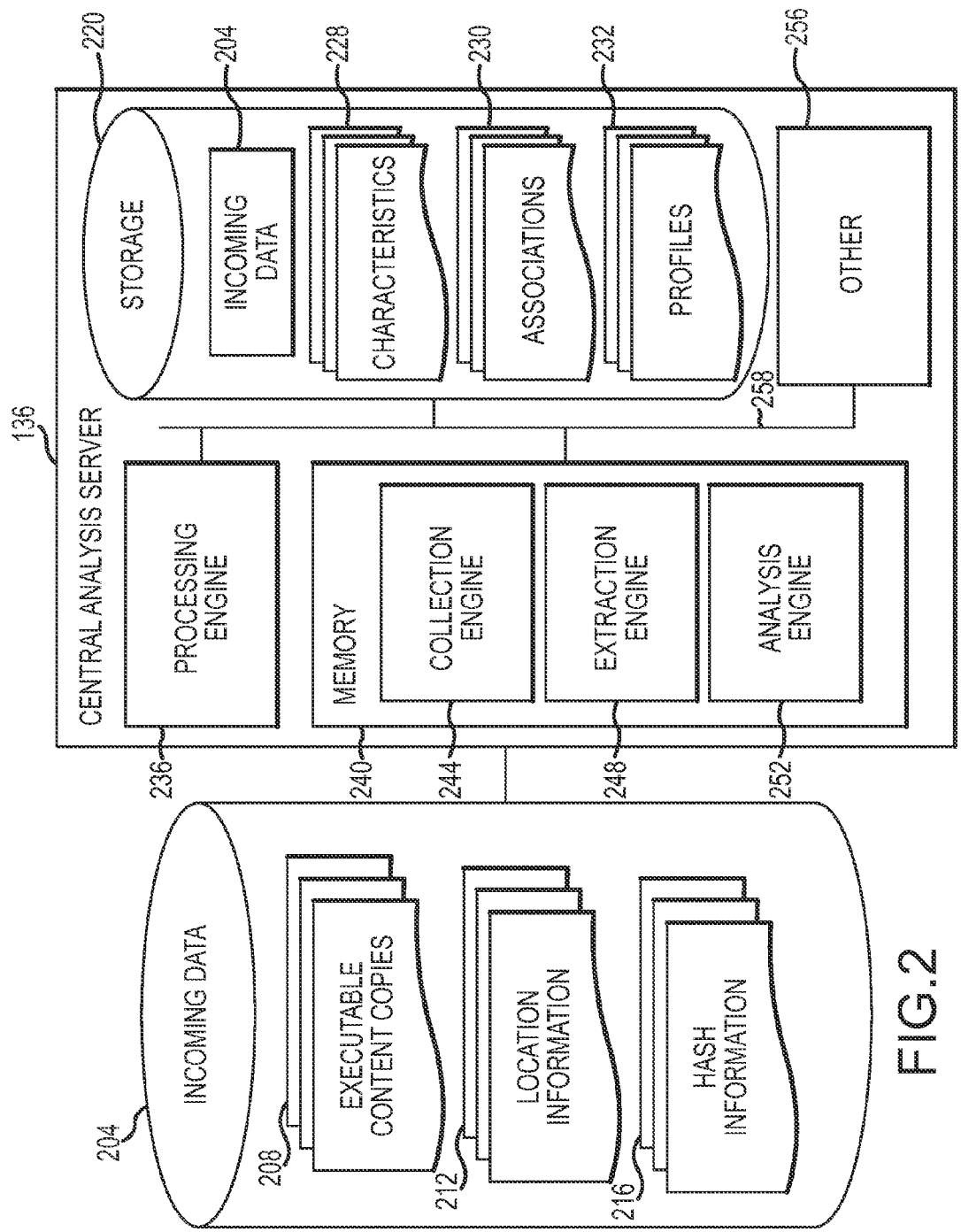
FIG. 2 is a more detailed functional block diagram of a central analysis server of the system of FIG. 1 for processing incoming executable content collected in the enterprise network.

Turning now to FIG. 2, a more detailed functional block diagram of the central analysis server 136 is depicted for use in analyzing incoming executable content data 204 in the enterprise infrastructure 100 of FIG. 1. More specifically, the central analysis server 136 is configured to receive and process incoming executable content data 204 transmitted and received from various collection agents (e.g., 104, 112, 120, 132) via internal network(s) 128 in order to support executable content monitoring within enterprise infrastructure 100. Although depicted as a single device (e.g., workstation, laptop, desktop, mobile device, and/or other computing device), one or more functionalities, processes or modules of the central analysis server 136 may be allocated or divided among a plurality of machines, devices and/or processes which may or may not be embodied in a single housing.

The central analysis server 136 may generally employ various components to collect incoming executable content data 204, extract various characteristics from the executable content copies, and analyze associations shared by the extracted characteristics to facilitate near real-time monitoring of executable content in the network enterprise 100. As shown, the central analysis server 136 may include a memory 240 (e.g., one or more RAM or other volatile memory modules) that contains one or more modules or engines that process incoming executable content data 204; a processing engine 236 (e.g., one or more processors, processing engines, CPUs, etc.) that executes the modules or engines from the memory 240; storage 220 (e.g., one or more magnetic disks, solid state drives, or other non-volatile memory modules) for storing incoming executable content data 204, characteristics 228, and profiles 232 (discussed in more detail below); and a number of other components 256 (e.g., input devices such as a keyboard and mouse, output devices such as a display and speakers, and the like), all of which may be appropriately interconnected by one or more system buses 258.

The central analysis server 136 may employ one or more engines that generally facilitate the processing of incoming executable content data 204 by performing a plurality of interconnected functions and storing resultant data in one or more databases of storage 220 (e.g., for use by analysts and the like). Each of the engines (and/or other engines, modules, logic, etc. disclosed and/or encompassed herein) may be in the form of one or more sets of computer-readable instructions for execution by the processing engine 236 and that may be manipulated by users in any appropriate manner to perform analysis of incoming executable content data 204 as disclosed herein. In this regard, the combination of the processing engine 236, memory 240, and/or storage 220 (i.e., machine/hardware components) on the one hand and the various engines/modules disclosed herein in one embodiment create a new machine that becomes a special purpose computer once it is programmed to perform particular functions of the utilities disclosed herein (e.g., pursuant to instructions from program software). While various engines have been depicted in FIG. 2 as being separate or distinct engines, it is to be understood that the functionalities or instructions of two or more of the engines may actually be integrated as part of the same computer-readable instruction set and that the engines have been depicted in the manner shown in FIG. 2 merely to highlight various functionalities of the system.

In one arrangement, the central analysis server 136 may include a collection engine 244 that collects incoming executable content data 204 received over one or more internal networks 128 from collection agents 107 and stores the incoming executable content data 204 in storage 220 in any appropriate manner (e.g., in one or more databases). For instance, the collection engine 244 may, in the situation where the incoming executable content data 204 indicates that the portion or type of executable content has already been identified by a collection agent 107 in the enterprise infrastructure 100, locate a corresponding portion (e.g., row, column, etc.) of a database in storage 220 (e.g., as identified by the hash value in the incoming executable content data 204) and update (e.g., add one or more entries to) the corresponding portion of the database (e.g., add the location information of the particular collection agent 107 that collected the executable content, the timestamp indicating the time at which the executable content was identified by the collection agent 107), and/or the like. As another example, and in the case where the incoming executable content data 204 indicates that the portion or type of executable content has not already been identified by a collection agent 107 in the enterprise infrastructure 100, the collection agent 244 may create a new entry in the database corresponding to the particular hash value in the incoming executable content data 204 and then appropriately populate the entry with the received data (e.g., with the executable content copy 208, location information 212, hash value 216, timestamp, and/or the like). E.g., see FIG. 5 which presents an example of a simplified database that may be stored in storage 220.

The central analysis server 136 may also include an extraction engine 248 that is broadly configured to access the incoming executable content data 204 from storage 220, extract (e.g., via any appropriate pattern recognition logic or the like) or otherwise generate any appropriate data characteristics 228 from the executable content data 204 (e.g., from the executable content copies 208) that may assist in the subsequent analysis and monitoring of potentially malicious content, and store the same in the database in storage 220 (e.g., where characteristics extracted from a particular portion of executable content are stored in a corresponding location in the database). Various types of characteristics that may be extracted or otherwise gleaned from the executable content data are envisioned that may be useful as part of subsequent analytics. Representative examples of extracted or gleaned characteristics may include "author marks" (e.g., a particular series of bits in a directory string), "tool marks" (e.g., compiler settings), behaviors (e.g., function extraction), patterns (e.g., byte sequences), text, and/or the like. Further examples include extracting network addresses, ports, patterns indicative of particular NOP (no operation)-sleds (e.g., a sequence of NOP instructions meant to "slide" a CPU's instruction execution flow to its final, desired, destination whenever the program branches to a memory address anywhere on the sled), and/or the like. E.g., see FIG. 5.

In one arrangement, the extracted characteristics (e.g., sets of characteristics) may be recorded (e.g., by the extraction engine 248) in any appropriate time-series form such as by location or host identifier (e.g., name, IP address, etc.), executable content identifier (e.g., hash value, file name, etc.), timestamp (e.g., date, time), etc. In another arrangement, the extracted characteristics may be grouped according to related content (e.g., common author/tool marks) in any appropriate hypergraph format. In a further arrangement, the extracted characteristics may be recorded in semantic graph form, such as in conjunction with metadata derived from the collection context of the content and/or from external sources (e.g., known malicious actors associated with the source of the executable content).

With continued reference to FIG. 2, the central analysis server 136 may also include an analysis engine 252 that is broadly configured to access the incoming executable content data 204 and/or extracted characteristics 228, identify associations 230 (e.g., linkages, connections, similarities, correlations, trends, etc.) among the extracted characteristics of various portions of executable content and/or in the incoming executable content data 204, and store the associations 230 in storage 220 in any appropriate manner and/or format (e.g. in one or more databases) for purposes of evaluating composite behaviors within the enterprise infrastructure 100. As an example, the analysis engine 252 may, upon analyzing the characteristics 228, determine that the same author mark is present in different portions (e.g., first and second portions) of executable content initially identified by different collection agents 107 of the enterprise infrastructure 100. Thereafter, the analysis engine 252 may, for instance, insert any appropriate pointer or links into the databases 220 of storage that connects the two portions of executable content in which the common author mark was found.

As another example, the analysis engine 252 may additionally or alternatively determine that the same tool mark is present in the aforementioned different portions of executable content. As a further example, the analysis engine 252 may determine that two or more distinct portions of executable content (e.g., identified by a common collection agent 107 or by different collection agents 107) with distinct author and tool marks may have common timestamps (e.g., all of such executable content portions were identified by one or more collections agents 107 at approximately the same time). In one arrangement, associations 230 may include detecting that the same portion of executable content (e.g., as identified by a particular hash value) has been identified on a plurality of different collection agents 107. Numerous other examples of associations are envisioned and included within the scope of the present disclosure.

Furthermore, profiles 232 of one or more particular "actors" (e.g., organizations, application providers, attackers, etc.) that are presumably responsible for deploying particular executable content (e.g., malicious, trusted, etc.) within the enterprise infrastructure may be developed (e.g., in automated and/or non-automated/manual manners) and stored in storage 220 in any appropriate manner (e.g., in one or more databases). E.g., see FIG. 6 which presents another example of a simplified database that may be stored in storage 220. Each profile 232 may generally be in the form of one or more extracted/gleaned characteristics 228 and essentially represent a signature that identifies an executable content actor. In one arrangement, associations 230 may be analyzed and used to generate one or more profiles. For instance, a particular combination of a directory string (e.g., a directory string named "dir") extracted from JavaScript® content within the enterprise infrastructure (e.g., and recorded as an author mark) and a group of compiler settings (e.g., enable compiler warnings, profile code when executed, copy non-embedded files to output folder, etc.) from the content (e.g., recorded as tool marks) that is repeatedly seen in executable content throughout the enterprise infrastructure 100 may be used to create a profile associated with a particular actor (e.g., Actor "A"). In one variation, a hierarchical structure or tree of actors may be appropriate created, where each actor is represented by a node of the tree, and where each actor includes all of the characteristics of higher level actors on the tree. This variation may allow for efficient data organization and facilitate analysis of enterprise infrastructure actors by enterprise personnel.

Actors may be tagged or otherwise labeled (e.g., known malicious, suspected malicious, known trusted, suspected trusted, etc.) in any appropriate manner. For instance, detection of an actor's profile (e.g., the actor's characteristics) in one version of Microsoft® Word that is different (e.g., in terms of one or more extracted characteristics) than another version of Microsoft® Word that is more widely disseminated throughout the enterprise may increase the likelihood that the actor is a malicious/non-trusted actor (or at least decrease the likelihood that the actor is a trusted/non-malicious actor). As another example, detection of the actor's profile within collected executable content received from a known malicious/non-trusted source may serve to increase the likelihood that the actor is a malicious/non-trusted actor (or at least decrease the likelihood that the actor is a trusted/non-malicious actor). In contrast, detection of the actor's profile within collected executable content received from a trusted source (e.g., a content update for a particular program) and/or within a mainstream version of a particular type of executable content may serve to increase the likelihood that the actor is a trusted/non-malicious actor (or at least decrease the likelihood that the actor is a malicious actor).

Profiles 232 may be developed via non-automated and/or automated manners. For instance, analysts and/or other enterprise personnel may identify or recognize particular characteristics, patterns, and the like of certain pieces (e.g., portions) or types of executable content indicative of a particular type of actor, organization, etc. (e.g., malicious, non-malicious, suspect, etc.) based upon personal knowledge, historical data, open-source information, and/or the like. As another example, any appropriate logic may be executed by a processor of the central analysis server or the like that is configured to automatically detect suspected malicious actors/organizations from the collected executable content and/or extracted characteristics. For instance, the central analysis server may be configured to flag as malicious (or at least possibly malicious) a profile constructed from characteristics extracted from executable content when the central analysis server detects (from extracted characteristics) that the executable content has been deployed on more than a threshold number of hosts within a particular period of time.

Enterprise personnel may be alerted in any appropriate manner (e.g., via a user interface interconnected to the central analysis server) that a profile has been flagged as malicious or possibly malicious. Profiles may be created, updated, and/or revised in near real-time (e.g., upon each new update of the database(s) of the central analysis server). Over time, one or more behaviors or other characteristics may be identified (e.g., automatically) or observed (e.g., manually) in conjunction with the particular profile characteristics (e.g., the author mark(s) and/or tool mark(s)) for providing situational awareness for cyber security and the like to support proactive defense and response. Subsequent executable content characteristics received and processed at the central server may serve to further refine developed profiles of identified actors.

In one arrangement, executable content (e.g., particular executable content associated with a unique hash value, any executable content associated with a particular actor profile, etc.) can be tracked or otherwise monitored over time as it spreads or propagates throughout the enterprise infrastructure 100 (e.g., through hosts, within subnets, across subnets, across networks, etc.), such as to present a near-real-time view of attacks-in-progress. For instance, the analysis engine 252 may identify any previously and/or newly collected executable content data 204 (from storage 220) having extracted/gleaned characteristics the same as or similar to (e.g., within a fuzzy interval) those of a particular profile (e.g., a specific set of extracted characteristics) and then attribute the executable content data 204 with the actor associated with the profile. The executable content attributed to the profile may then be tracked and/or analyzed in various manners.

In one embodiment, the hash value 216, location information 212 and/or timestamp of each of one or more portions of executable content attributed to the particular profile may be obtained and used to monitor the specific portions as the portions move throughout the enterprise infrastructure (e.g., between a plurality of collection agents 107). As an example, a time-series graph of the various locations a portion of such executable content has traveled and corresponding timestamps may be constructed and used to determine whether an attack is occurring. For instance, a determination that the portion of executable content has been identified at more than a particular number of collections agents 107 with a particular time period may indicate an attack.

In another arrangement, particular portions and/or types of enterprise executable content may be monitored and/or tracked over time regardless of any particular profile and/or actor associated with the executable content. For instance, enterprise personnel may, after analyzing the collected executable content and extracted characteristics in storage 220, determine that a particular piece of executable content appears interesting for one or more reasons (e.g., its difference from other similar pieces of executable content, the rate at which it is replicating itself, a timestamp of when the executable content was received at a host, a manner by which the executable content was transferred to a host, particular extracted characteristics 228, etc.). Again, the particular portion of executable content may be tracked over time as it moves between collections agents 107 in the enterprise infrastructure 100.

Figure 3B:
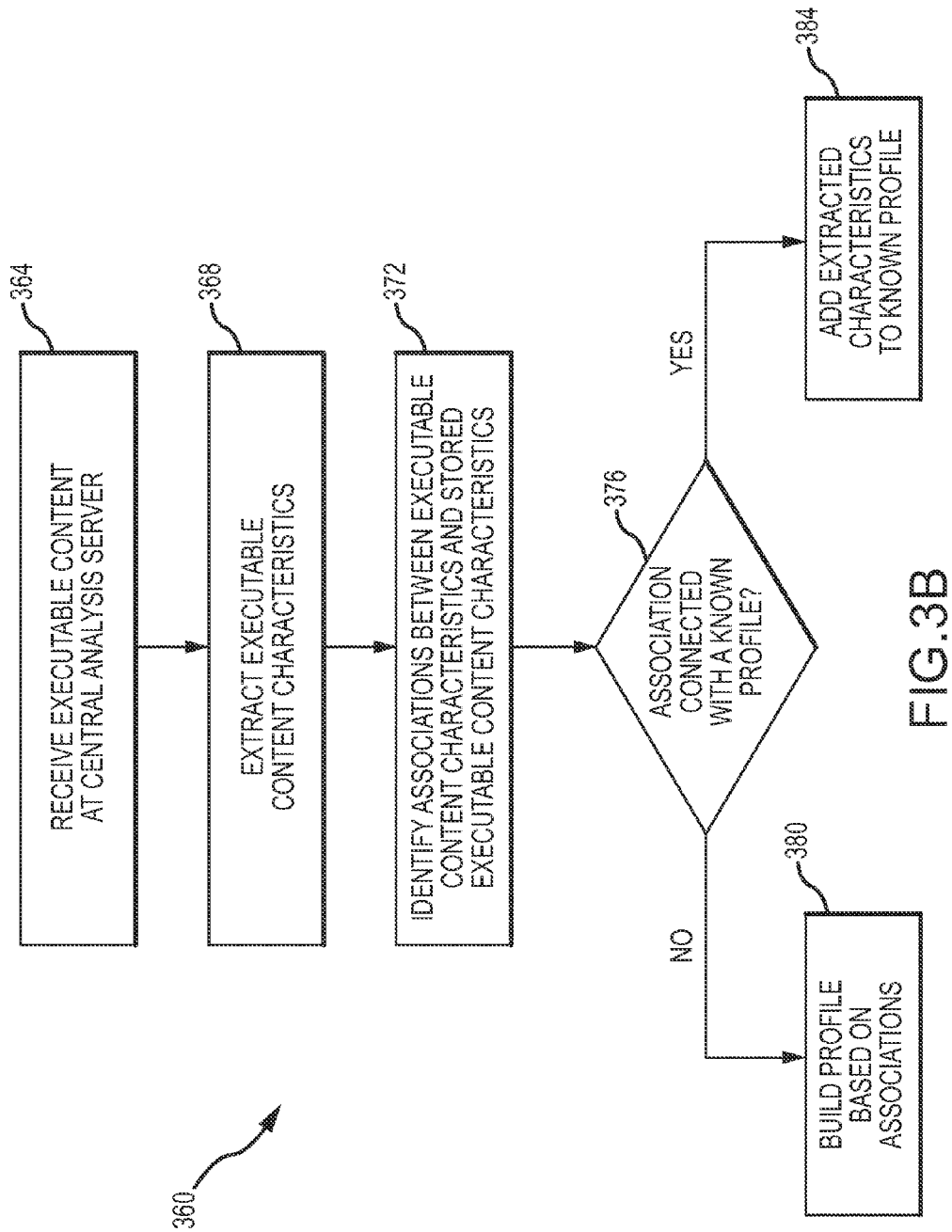
FIG. 3b illustrates a flow diagram of a method of processing incoming executable content data at the central analysis of FIG. 2.
Figure 4:
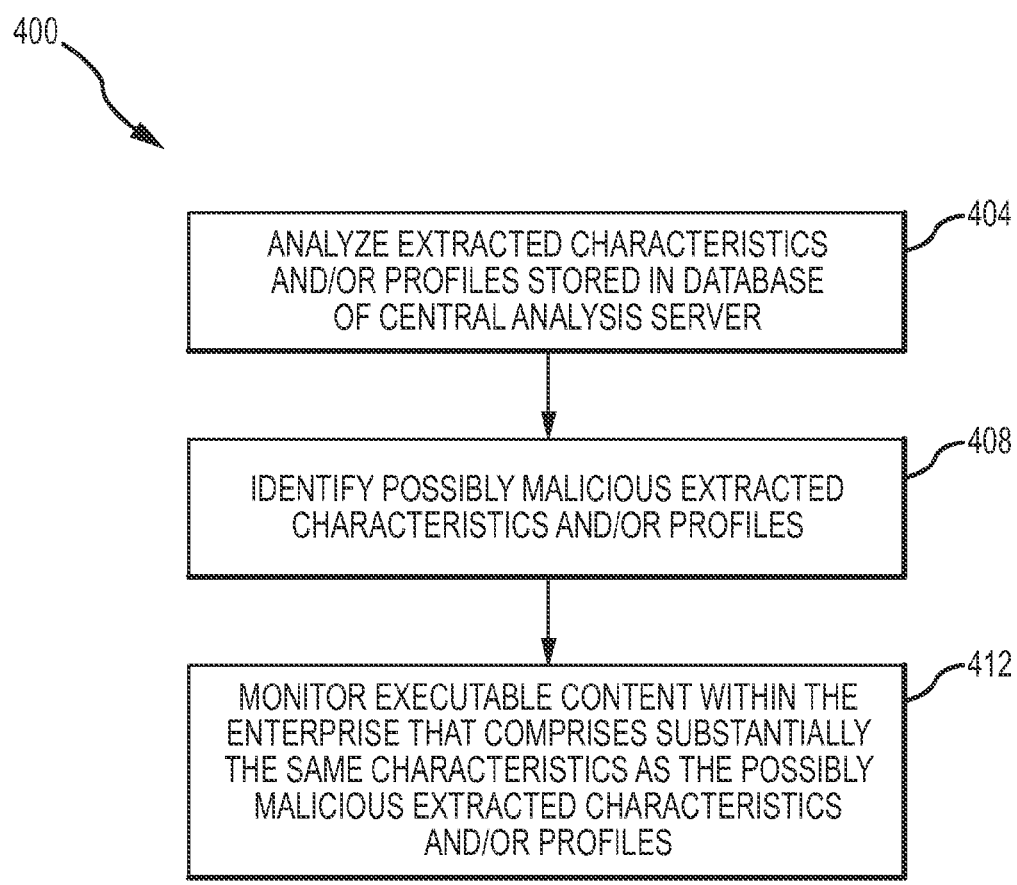
FIG. 4 illustrates a flow diagram of a method of analyzing characteristics of executable content in order monitor potentially malicious executable content.

To further facilitate the reader's understanding of the various functionalities of the utilities discussed herein, reference is now made to flow diagrams in FIGS. 3A, 3B and 4, which respectively illustrate methods 300, 360 and 400 for use in identifying, analyzing, and monitoring executable content in the enterprise network 100. While specific steps (and orders of steps) of the methods 300, 360 and 400 have been illustrated and will be discussed, other methods (including more, fewer or different steps than those illustrated) consistent with the teachings presented herein are also envisioned and encompassed with the present disclosure.

With initial reference to FIG. 3A method 300 relates generally to the collection of executable content in enterprise network 100. The steps of method 300 may occur at one or more of the collection agents 107 (e.g., collection agents 108, 116, 124, 132) in enterprise network 100. The method 300 may include identifying 304 executable content (e.g., by a collection agent 107) in enterprise network 100 (e.g., such as by identifying executable content residing or traversing the device or location being monitored by the collection agent 107. The method 300 may continue by obtaining 308 a hash value associated with the executable content (e.g., such as by subjecting the executable content to any appropriate hash function) and querying 312 whether the hash value is recognized.

As discussed previously, each collection agent 107 may in one arrangement have access to a hash value database that includes hash values associated with executable content already identified somewhere in the enterprise infrastructure 100. In the event the hash value is not recognized (e.g., not already present in the database), the collection agent 107 may generate and transmit a copy of the identified executable content (e.g., along with the hash value, location information, and the like) to the central analysis server 136 over one or more internal networks 128. If the hash value is recognized (e.g. is already present in the database), the collection agent 107 may transmit notice of detection of the executable content to the central analysis server 136, such as a message that includes the hash value, location information, etc. (but not a copy of the executable content so as to limit use of enterprise infrastructure resources).

Turning now to FIG. 3B, method 360 relates generally to the processing of executable content at the central analysis server 136. Method 360 may begin by receiving 364 incoming executable content data 204 at the central analysis server 136. For instance, the collection engine 244 may receive the incoming executable content data 204 and store the same in storage 220 in one or more databases in any appropriate format as discussed above. Method 360 may proceed by extracting 368 characteristics from the executable content, such as by accessing the stored executable content data 204 in incoming data information 224 and subjecting the executable content to any appropriate pattern recognition logic operable to extract user-specified segments from the executable content, and saving the extracted characteristics in storage 220 in one or more databases. E.g., see FIG. 5.

At 372, the method 360 may identify associations 230 between various ones or sets of the extracted executable content characteristics 228 and store the associations 230 in storage 220. As discussed previously, the analysis engine 252 may analyze the extracted characteristics 228 and look for one or more similarities among the extracted characteristics 228. For instance, the analysis engine 252 may detect that that same (or similar) author mark (e.g., particular string of directory bits) is present in two or more portions of executable content in the enterprise infrastructure 100 and record the same as an association 230 in storage 220 (e.g., by appropriately linking two or more portions of executable content in which the same/similar author mark was detected). Of course, numerous other types and more complicated examples of associations among extracted characteristics or executable content copies are envisioned and encompassed within the scope of the present disclosure.

In this method 360, the analysis engine 252 may query 376 whether any identified associations 230 (e.g., such as a newly identified association 230) is connected with a known profile 232. For instance, the analysis engine 252 may compare the associated extracted characteristics and determine whether the same or similar characteristics make up at least some of the characteristics of any known profiles 232. E.g., see FIG. 6. A positive answer to the query 376 may result in the analysis engine 252 adding 384 or at least appropriately linking the association to the one or more know profiles 232. Otherwise, the analysis engine 252 may, in some arrangements, build 380 one or more profiles based on the identified association(s) 230.

In the method 400 of FIG. 4, incoming executable content data 204, extracted characteristics 228, associations 230, and/or profiles 232 may be used to monitor executable content traversing or otherwise disposed within enterprise network 100 (e.g., such as to track possibly or known malicious executable content). Method 400 may begin by analyzing 404 the incoming executable content data 204, extracted characteristics 228, associations 230, and/or profiles 232 (e.g., as stored in one or more databases of storage 220) of the central analysis server 136 and identify any "interesting" incoming executable content data 204, extracted characteristics 228, associations 230, and/or profiles 232. As an example, a particular profile labeled as malicious or even "suspect" may be identified. The method 400 may then monitor 412 executable content within the enterprise infrastructure 100 (e.g., via analyzing the extracted characteristics 228 and/or associations 230) that has extracted/gleaned characteristics the same as or similar to (e.g., within a fuzzy interval) those of the particular profile may be attributed to (e.g., correlated with) the profile (e.g., by updating the particular entry(ies) in one or more databases in storage 220 associated with the profile). Furthermore, executable content attributed to the profile may be tracked and/or analyzed in various manners. As an example, the particular hash value of each portion of executable content having characteristics the same or similar to those of the particular profile may be tracked. With respect to one of such hash values that is detected at a plurality of collections agents 107 in the enterprise infrastructure 100, for instance, the analysis engine 252 may record (e.g., in one or more databases of the storage 220) the location, time, etc. that the hash value was detected at each of the collection agents and present the same (e.g., via any appropriate display in communication with the central analysis server 136) for use by enterprise analysts.

The utilities disclosed herein may advantageously allow for a near real-time analysis of executable content across an enterprise infrastructure. More particularly, the identification, characterization and attribution of executable content with an enterprise infrastructure as disclosed herein may allow for a currently non-existent form of situational awareness for cyber security and the like to support proactive defense and response and provide a breakthrough cyber capability for significantly limiting the capabilities of malicious actors.

It will be readily appreciated that many deviations and/or additions may be made from or to the specific embodiments disclosed in the specification without departing from the spirit and scope of the invention. In one arrangement, it is envisioned that the disclosed utilities could be used to identify and monitor other types of content in enterprise network 100. As an example, particular types of non-executable content may be associated with malicious activity on enterprise infrastructure 100. The collections agents (e.g., 108, 116, 124, 132) may detect and transmit such content in a manner similar to that disclosed with respect to executable content. Central analysis server 136 may process and monitor the non-executable content data by extracting characteristics from the collected data that may assist in the identification of malicious activity. Just as with executable content, the processing and monitoring of central analysis server 136 may occur through an analysis of associations shared between extracted characteristics and subsequent comparison to known malicious profiles.

Embodiments disclosed herein can be implemented as one or more computer program products, i.e., one or more modules of computer program instructions encoded on a computer-readable medium for execution by, or to control the operation of, data processing apparatus. For example, the logic or software of the collection engine 244, extraction engine 248, and analysis engine 252 responsible for the various functionalities disclosed herein may be provided in such computer-readable medium of the central analysis server 136 and executed by the processing engine 236 as appropriate. The computer-readable medium can be a machine-readable storage device, a machine-readable storage substrate, a non-volatile memory device, a composition of matter affecting a machine-readable propagated signal, or a combination of one or more of them. In this regard, central analysis server 136 may encompass one or more apparatuses, devices, and machines for processing data, including by way of example a programmable processor, a computer or multiple processor or computers. In addition to hardware, the central analysis server 136 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein may be written in any form of programming language, including compiled or interpreted languages, and may be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by an information flow network.

The block diagrams, processes, protocols and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

In some embodiments, the central analysis server 136 may comprise one or more of various types of devices, including, but not limited to a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer having a display device (e.g., a CRT (cathode ray tube) or LCD (liquid crystal display) monitor), for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments and/or arrangements can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, the foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for use in analyzing executable content within at least one network of an enterprise, the method comprising:
receiving multiple instances of executable content at a central analysis server over at least one network of an enterprise via at least one of a plurality of collection agents disposed within the at least one network, the at least one of the plurality of collection agents remote from and in operative communication with the central analysis server;
extracting, by a hardware processor of the central analysis server, one or more characteristics from each instance of the received executable content;
identifying, by the hardware processor, associations among the extracted characteristics;
determining, based on the associations among the extracted characteristics, that a first portion of executable content is associated with a non-trusted entity;
obtaining a hash value of the first portion of executable content and storing the hash value and the associated extracted characteristics to create a non-trusted entity profile;
storing the extracted characteristics, identified associations, and hash value in a database of the central analysis server, the database accessible by the plurality of collection agents such that each of the plurality of collection agents is operable to identify at least another portion of executable content associated with the non-trusted entity based on the hash value that has been recognized and presented in the database; and
receiving, by the central analysis server, an indication of notice from one of the plurality of collection agents indicative of a detection of the at least another portion of executable content associated with the non-trusted entity at the one of the plurality of collection agents, the indication comprising the hash value, location information but not a copy of the at least another portion of executable content to limit use of enterprise infrastructure resources and so as to update the non-trusted entity profile.

2. The method of claim 1, wherein the identifying comprises detecting at least one common extracted characteristic shared by the first portion and a second portion of the received executable content.

3. The method of claim 1, wherein the extracted characteristics are selected from the group consisting of: an author mark, a tool mark, a behavior, a pattern, and a text sequence.

4. The method of claim 1, further comprising:
updating the non-trusted entity profile based on at least one of the identified associations, wherein the non-trusted entity profile identifies at least one entity associated with the executable content linked to the at least one association, the at least one entity including the non-trusted entity.

5. The method of claim 4, further comprising:
monitoring executable content associated with the non-trusted entity profile within the enterprise by detecting at least one common characteristic between extracted characteristics of the first portion of received executable content and the non-trusted entity profile.

6. The method of claim 5, further comprising:
attributing the first piece of executable content to the non-trusted entity profile.

7. The method of claim 1, further comprising:
tracking the hash value associated with the first portion of executable content as it is detected by the one of the plurality of collection agents by recording a location of the one of the plurality of collection agents that detected the hash value within the enterprise and storing the location of the one of the plurality of collection agents that detected the hash value in the database of the central analysis server.

8. The method of claim 1, further comprising before the receiving:
detecting executable content within the at least one network of an enterprise with the at least one of a plurality of collection agents disposed within the at least one network of the enterprise;
copying the executable content; and
distributing the executable content copies to the central analysis server.

9. The method of claim 8, further comprising:
tagging, by the collection agent, the executable content copies with location information that identifies a location of the collection agent within the enterprise.

10. The method of claim 8, wherein the hash value uniquely identifies the first portion of executable content.

11. The method of claim 8, wherein the collection agent resides at a network host.

12. The method of claim 8, wherein the collection agent resides at a strategic point in the enterprise infrastructure, the strategic point being selected from the group consisting of:
a network edge, a major subnet division, and a router.

13. A system for analyzing executable content within at least one network of an enterprise, comprising:
a plurality of collection agents disposed within one or more networks of an enterprise and executable by one or more hardware processors of one or more devices within the one or more networks, wherein each collection agent is configured to detect a presence of multiple instances of executable content within the enterprise; and
a central analysis server remotely disposed from and in operative communication with the plurality of collection agents via the one or more networks, the central analysis server comprising:
a collection engine, executable by a hardware processor of the central analysis server, that is configured to capture and store the multiple instances of executable content received from the plurality of collection agents;
an extraction engine, executable by the hardware processor of the central analysis server, that is configured to extract one or more characteristics from each instance of the executable content;
an analysis engine, executable by the hardware processor of the central analysis server, that is configured to:
identify associations among the extracted characteristics;
determine, based on the associations among the extracted characteristics, that a first portion of executable content is associated with a non-trusted entity;
obtain a hash value for the first portion of executable content; and
store the hash value and the associated extracted characteristics to create a non-trusted entity profile; and
a first database that is configured to store the extracted characteristics, identified associations, and hash value, the first database being accessible by the hardware processor of the central analysis server and the plurality of collection agents such that each of the plurality of collection agents is operable to identify at least another portion of executable content associated with the non-trusted entity based on the hash value that has been recognized and presented in the database, wherein each of the plurality of collection agents is operable to transmit to the central analysis server an indication of notice indicative of a detection of the non-trusted entity at the corresponding collection agent, the indication comprising the hash value, location information but not a copy of the at least another portion of executable content to limit use of enterprise infrastructure resources and so as to update the non-trusted entity profile.

14. The system of claim 13, wherein at least one of the collection agents resides at a strategic point in the enterprise infrastructure, the strategic point being selected from the group consisting of: a network edge, a major subnet division, and a router.

15. The system of claim 13, wherein the analysis engine is configured to update the non-trusted entity profile based on the identified associations, wherein the non-trusted entity profile identifies at least one entity associated with the executable content linked to the at least one association, the at least one entity including the non-trusted entity.

16. The system of claim 13 further comprising:
a second database, accessible by the hardware processor of the central analysis server, that is configured to store the non-trusted entity profile.

17. The system of claim 13, wherein the extracted characteristics are selected from the group consisting of: an author mark, a tool mark, a behavior, a pattern, and a text sequence.

18. The system of claim 13, wherein the first database is configured to store information specifying a unique location associated with each piece of executable content.

19. A system for analyzing executable content within at least one network of an enterprise, comprising:
a plurality of collection agents disposed within one or more networks of an enterprise and executable by one or more hardware processors of one or more devices within the one or more networks, wherein each collection agent is configured to detect a presence of multiple instances of executable content within the enterprise; and
a central analysis server interconnected to the plurality of collection agents via the one or more networks, the central analysis server comprising:
a collection engine, executable by a hardware processor of the central analysis server, that is configured to capture and store the multiple instances of executable content received from the plurality of collection agents;
an extraction engine, executable by the hardware processor of the central analysis server, that is configured to extract one or more characteristics from each instance of the executable content, wherein the extracted characteristics include at least one of an author mark, a tool mark, a behavior, a pattern, and a text sequence;
an analysis engine, executable by the hardware processor of the central analysis server, that is configured to:
identify associations among the extracted characteristics to determine that a first portion of executable content is associated with a non-trusted entity;
obtain a hash value for the first portion of executable content; and
store the hash value and the associated extracted characteristics to create a non-trusted entity profile; and
a first database that is configured to store the extracted characteristics, identified associations, and hash value, the first database being accessible by the hardware processor of the central analysis server and the plurality of collection agents such that each of the plurality of collection agents is operable to identify at least another portion of executable content associated with the non-trusted entity based on the hash value that has been recognized and presented in the database,
wherein each of the plurality of collection agents is operable to transmit to the central analysis server an indication of notice indicative of a detection of the non-trusted entity at the corresponding collection agent, the indication comprising the hash value, location information but not a copy of the at least another portion of executable content to limit use of enterprise infrastructure resources and so as to update the non-trusted entity profile,
and wherein the analysis engine is configured to identify associations among the extracted characteristics to identify a second portion of executable content being associated with the non-trusted entity, wherein the non-trusted entity profile is updateable in relation to the second portion of executable content, and wherein each of the plurality of collection agents is operable to identify at least another portion of executable content associated with the non-trusted entity at least partially based on the non-trusted entity profile.

20. The system of claim 19, wherein the collection engine is configured to capture and store the second portion of executable content received from the plurality of collection agents, and wherein the extraction engine is configured to extract one or more characteristics from the second portion of executable content, and wherein the analysis engine is configured to identify associations among the extracted characteristics to determine the second portion of executable content is associated with the non-trusted entity, and wherein the extracted characteristics and identified associations of the second portion of executable content are stored with the non-trusted entity profile.

21. The system of claim 20, wherein the received indication from the one of the plurality of collection agents is a message that includes the hash value associated with the at least another portion of executable content.

\* \* \* \* \*